(12) United States Patent
Narayanaswami et al.

(10) Patent No.: US 10,565,483 B2
(45) Date of Patent: Feb. 18, 2020

(54) TWO-DIMENSIONAL BARCODE TO AVOID UNINTENTIONAL SCANNING

(75) Inventors: Chandrasekhar Narayanaswami, Wilton, NY (US); Umut Topkara, Scarsdale, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 189 days.

(21) Appl. No.: 13/600,775

(22) Filed: Aug. 31, 2012

(65) Prior Publication Data
US 2014/0061310 A1 Mar. 6, 2014

(51) Int. Cl.
*G06K 7/08* (2006.01)
*G06K 19/06* (2006.01)
*G06K 19/073* (2006.01)

(52) U.S. Cl.
CPC . *G06K 19/06037* (2013.01); *G06K 19/06075* (2013.01); *G06K 19/07318* (2013.01)

(58) Field of Classification Search
CPC ....... G06K 19/07749; G06K 19/07718; G06K 17/0025; G06K 19/0776; G06K 19/07716; G06K 19/07758; G06K 19/07783; G06K 19/07779; G06K 19/07786; G06K 19/07771; G06K 2017/004; G06K 19/0723; G06K 7/0095; G06K 13/30; G06K 17/0009; G06K 17/0022; G06K 17/0029; G06K 19/02; G06K 19/047; G06K 19/07722; G06K 19/07796; G06K 1/128; G06K 1/18; G06K 2017/0064; G06K 7/14; G06K 19/06028; G06K 19/06037; G06K 19/06046; G06K 2019/06225; G06K 7/1473; G06K 7/1491; G06K 19/06056; G06K 19/06103; G06K 1/121; G06K 7/10732; G06K 7/12; G06K 7/1434; G06K 19/06009; G06K 19/08; G06K 19/14; G06K 5/02; G06K 19/06112; G06K 19/083; G06K 2019/06281; G06K 2209/01; G06K 5/00; G06K 7/10544; G06K 7/10722; G06K 7/10801; G06K 7/10861; G06K 7/1447; G06K 7/1456; G06K 9/00979; G06K 9/183; G06K 9/6288; G06K 19/0614; G06K 19/10; G06K 1/123; G06K 7/0004; G06K 7/10811; G06K 7/1417; G09B 7/063; G06Q 50/03; G06Q 30/06; G06Q 10/08; G06Q 10/02; G06Q 10/06; G06Q 10/083; G06Q 10/087; G06Q 30/02; G06Q 30/0246;
(Continued)

(56) References Cited

U.S. PATENT DOCUMENTS 5,331,137 A * 7/1994 Swartz .................... G06K 7/14
235/375
6,119,943 A * 9/2000 Christy .................. G06K 1/121
235/462.04
(Continued)

*Primary Examiner* — Thien T Mai
(74) *Attorney, Agent, or Firm* — Cantor Colburn LLP; Daniel Morris

(57) ABSTRACT

A method of disseminating a message is disclosed. The message is encoding in a barcode. A selected region of the barcode is damaged so as to hinder decoding of the message at a scanning device. The damaged region of the barcode may be occluded from the scanning device in order to enable the scanning device to read the barcode and the message therein.

8 Claims, 6 Drawing Sheets

(58) Field of Classification Search
CPC .............. G06Q 10/101; G06Q 20/347; G06Q 30/0601; G06Q 50/00; G06Q 50/01; G06Q 50/24
USPC .............................. 235/454, 494; 340/572.1
See application file for complete search history.

(56) References Cited

U.S. PATENT DOCUMENTS

| | | | |
|---|---|---|---|
| 6,604,684 B1 | 8/2003 | Schmidt et al. | |
| 6,685,095 B2 | 2/2004 | Roustaei et al. | |
| 8,162,222 B2 | 4/2012 | Krichi et al. | |
| 2003/0168512 A1* | 9/2003 | Longacre et al. ............ | 235/454 |
| 2004/0020989 A1* | 2/2004 | Muramatsu ...... | G06K 19/06037 235/462.1 |
| 2005/0109846 A1* | 5/2005 | Lubow ............. | G06K 19/06028 235/462.01 |
| 2006/0022059 A1* | 2/2006 | Juds ................... | G06K 7/10732 235/494 |
| 2007/0013521 A1* | 1/2007 | Lindsay et al. ............ | 340/572.1 |
| 2007/0090197 A1* | 4/2007 | Senda ...................... | G06K 7/14 235/494 |
| 2008/0302872 A1 | 12/2008 | Tate | |
| 2013/0001310 A1* | 1/2013 | Miyazaki et al. ....... | 235/462.04 |

\* cited by examiner

TWO-DIMENSIONAL BARCODE TO AVOID UNINTENTIONAL SCANNING

BACKGROUND

The present disclosure relates to scanning of optical machine-readable representation of data, also known as barcodes, and more specifically, to a barcode design that reduces unintentional scanning.

With the recent advent of smartphones that have the ability to image and scan barcodes, businesses have been seeking to use barcode technology to market to consumers via their smartphones. Two-dimensional barcodes, in particular, are seen as useful marketing tools due to the amount of information that can be encoded therein. Businesses that want to connect to the consumers have designed two-dimensional barcodes that include encoded information such as a website or other link, with the idea that when the consumer scans the barcodes with his or her smartphone, the smartphone accesses the web link, which generally has a targeted message for the consumer. As a matter of convenience, these marketing barcodes are often printed on an outer surface of a package. Unfortunately, Universal Product Codes (UPCs) that provide price and inventory information are also found on the outside of these product packages and are generally in a proximate location with respect to the two-dimensional barcode. Due to their proximity, a cashier or consumer may mistakenly scan the marketing barcodes instead of the UPC code. This may lead to a minor inconvenience or to a mistaken charge to the consumer depending on the ability of the scanning device.

SUMMARY

According to one embodiment, a method of disseminating a message is disclosed, including: encoding the message in a barcode; and damaging a selected region of the barcode to hinder decoding of the message at a scanning device, wherein occluding the selected region of the barcode from the scanning device enables the scanning device to read the barcode.

According to another embodiment, a method of disseminating a message is disclosed, including: encoding the message in a signal that includes a removable second message configured to obscure the encoded message; and enabling a user to remove the second message from the signal, obtain the signal with the second message removed, and read the encoded message from the obtained signal.

According to another embodiment, a method of forming a selectively readable barcode is disclosed, including: forming the barcode on an article; and replacing a region of the barcode with a pattern configured to disable reading of the barcode by a scanner, wherein removing the pattern from view of the scanner enables reading of the barcode.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
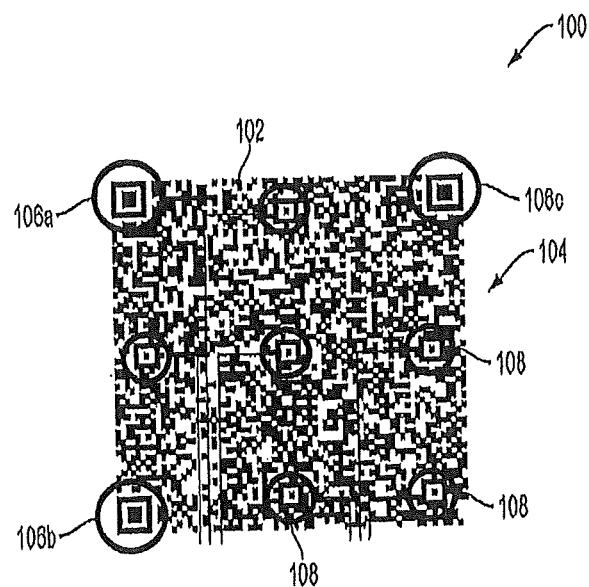
FIG. 1 shows an unmarked two-dimensional barcode that includes an encoded message.

FIG. 1 shows an exemplary unmarked two-dimensional barcode 100 that includes an encoded message. The unmarked barcode 100 may be marked or "damaged" using the methods disclosed herein in order to create a barcode that can not be scanned unintentionally. The exemplary barcode 100 is encoded using Quick Response code (QR code). The standard QR barcode 100 includes a number of pixels that encode one or more messages. The one or more messages may include a coupon, a website link, a point or reward accumulation system, a price, an inventory number, etc. A scanning device or scanner scans the barcode and performs a procedure for deciphering or decoding the encoded message. In an exemplary embodiment, the scanning device may be a smartphone that takes a picture of image of the barcode and performs the decoding procedure on the picture to read the encoded message. In an alternate embodiment, the scanning device may be a laser scanner or other barcode scanning device.

In general, the barcode 100 includes a data area 102 that includes the encoded message and a quiet zone 104 that surrounds the data area 102. The quiet zone 104 is a selected number of pixels in width (generally four or more pixels) and is useful in enabling the scanning device to locate the data area 102. The data area 102 also includes several prescribed patterns that are located at selected locations in the data area 102 in order to enable the scanning device in decoding the encoded message.

Figure 2:
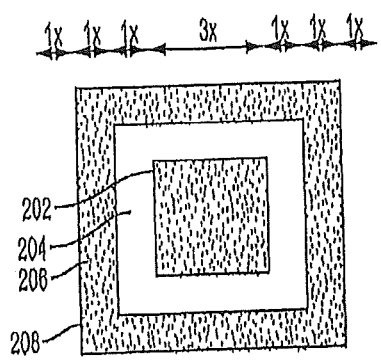
FIG. 2 shows an exemplary finder pattern used in the exemplary barcode of FIG. 1.

The exemplary barcode 100 includes three "finder patterns" 106a, 106b and 106c. Each finder pattern is composed of a square target area, as shown in FIG. 2. The finder pattern includes a black square 202 that is surrounded by a white border 204, which is in turn surrounded by a black border 206, which in turn is surrounded by a white border 208. When viewed along a line that passes through the central black square, the finder patterns has a distinctive 1-1-1-3-1-1-1 ratio of black and white pixels. In particular, when scanning along this central line, the scanning device sequentially reads one white pixel, one black pixel, one white pixel, three black pixels, one white pixel, one black pixel and one white pixel. In the exemplary barcode 100, three finder patterns are included, each of the finder patterns are located in a corner of the data area 102. Therefore, one corner of the data area 102 does not have a finder pattern. The barcode is readable when it is oriented as shown in FIG. 1, i.e., one finder pattern (i.e., 106a) is in the top left corner, one finder pattern (i.e., 106c) is in the top right corner and one finder pattern (i.e., 106b) is in the lower left corner. When scanning the barcode, the scanning device obtains an image of the barcode and locates the finder patterns 106a, 106b and 106c. The scanning device then performs one or more rotational transformations on the obtained image until the finder patterns 106a, 106b and 106a are suitable oriented. When attempting to scan the barcode at other orientations, the resulting decoded message is meaningless.

Figure 3:
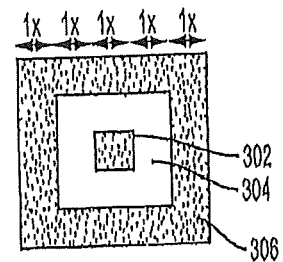
FIG. 3 shows an exemplary alignment patterns used in the exemplary barcode of FIG. 1.

The barcode 100 also includes various alignment patterns 108, as shown in FIG. 3. An alignment pattern includes a black square 302 surrounded by a white border 304 which in turn is surrounded by a black border 306. Alignment patterns are identified by a 1-1-1-1-1 ratio of black to white pixels. As the scanning device scans the alignment patterns along a selected direction, the scanning device sequentially reads one black pixel, one white pixel, one black pixel, one white pixel and one black pixel. The alignment patterns may be read by the scanning device to counteract for image distortion that often occurs when the barcode is printed on a flimsy or flexible surface or when the barcode is printed on a rigid yet curved surface. Therefore, the scanning device may decode the encoded message of the barcode without a user scanning the barcode having to hold the barcode at a specification direction with respect to a scanning device. Finally, the data area 102 includes various black and white pixels that represent the encoded message.

Figure 4:
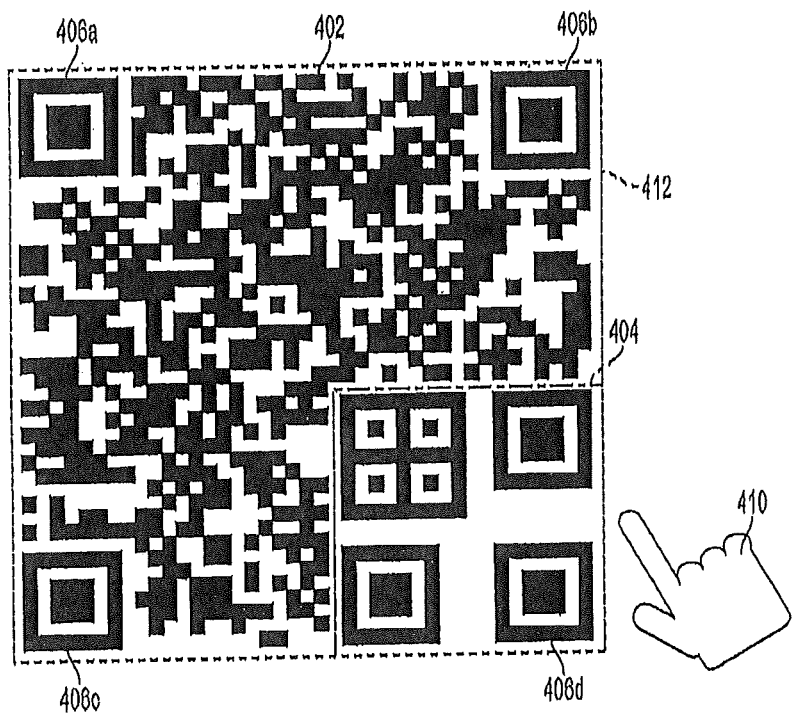
FIG. 4 shows an exemplary peacocked barcode of the present disclosure.

FIG. 4 shows an exemplary peacocked barcode 400 of the present disclosure. As shown in FIG. 4, the peacocked barcode 400 may be formed by removing a section of an unmarked barcode (i.e., exemplary unmarked barcode 100 of FIG. 1) replacing the removed section with a replacement section 404 that has a selected design or pattern. In various embodiments, the corner of barcode 100 that does not have a finder pattern is the section that is removed and replaced by the replacement section 404. The replacement section 404 may be referred to herein as a "damaged" section 404 or as a damaged region 404. The damaged region 404 may or may not be physically damaged, but includes one or more patterns that are selected to "confuse" a scanner or otherwise interfere with the scanner's ability to decode the encoded message within the barcode 400. The pattern may cause the scanning device to either fail to read the barcode or increase a read time of the barcode, i.e., a time that the scanner takes to successfully read the encoded message. The message in the peacocked barcode 400 may be encoded using standard error correction methods, such as Reed-Solomon error codes. The peacocked barcode 400 may also come in a number of sizes, may have any number of pixels and/or may have any desired resolution.

Figure 5:
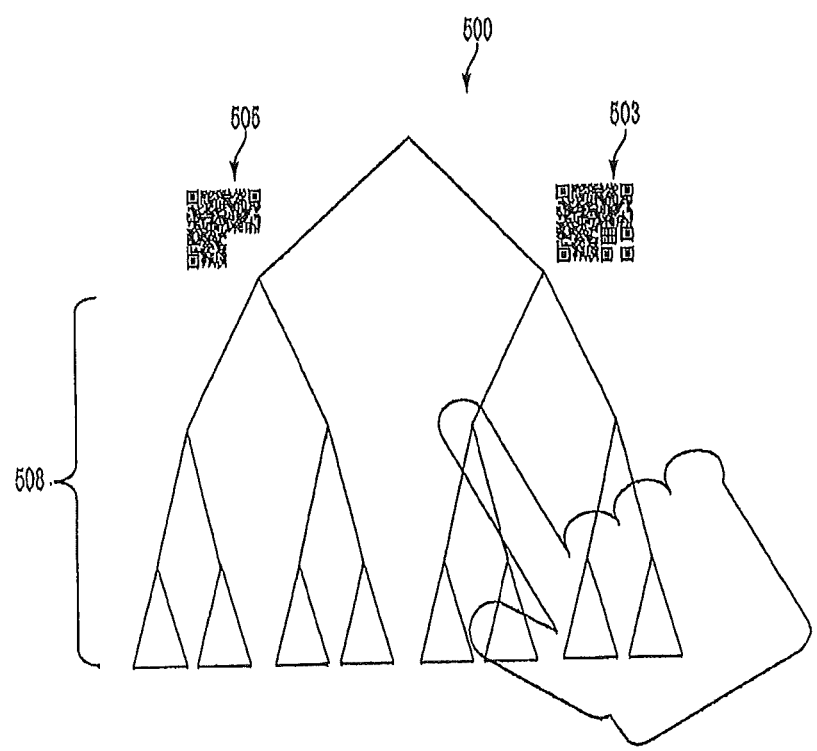
FIG. 5 shown an exemplary search space of the exemplary peacocked barcode.

FIG. 5 shown an exemplary search space of the peacocked barcode 400. Barcode detection is a search problem. The search space shown in FIG. 5 shows various decision branches representing a search that is made in order to correctly read the message encoded in the barcode. A scanner generally starts at the top of the decision tree and proceeds downward to decode the message. The search space for the exemplary peacocked barcode 503 may be represented by the decision tree 500. Barcode 505 represents peacocked barcode 503 with the damaged region removed. The search space of the barcode 503 may be represented by tree branch 508. Thus, the search space for the peacocked barcode 503 is generally larger than the search space for the barcode 505. In various embodiments, the pattern of the damaged region is selected to significantly expand a search space of the barcode. Therefore, a scanner may require a significant amount of time to search through the search space of the peacocked barcode 503.

Returning to FIG. 4, the damaged region 404 of the peacocked barcode 400 includes a finder pattern 404d as well as other patterns. The data area 402 thus has four finder patterns 406a, 406b, 406c and 406d, with each finder pattern located in a corner of the data area 402. Thus, the search space of the peacocked barcode 400 is expanded due to the possibility that any of the finder patterns 406a, 406b, 406c and 406d may be located in the upper left corner. Consequently, a scanning device may take significantly longer to decode a peacocked barcode 400 than to decode a barcode that does not have the damaged region 404.

Scanning devices are generally programmed so that if a message is not read after a selected amount of time (its scanning duration), the scanning device abandons its attempt to read the message and/or produces an error message. Thus, by expanding the search space (i.e., adding the damaged region), the scanning device may be forced to abandon reading the message before it is able to read the message, thereby rendering the peacocked barcode 400 unreadable for all practical purposes.

Although the damaged region 404 of the peacocked barcode 400 generally disables or hinders the peacocked barcode 400 from being read, an operator may be able to perform an action that enables the peacocked barcode 400 to be read at a scanning device. In an exemplary operation, the operator may cover or occlude the damaged region 404 from being viewed by the scanning device or otherwise remove the damaged region 404 form the purview of a scanning device. In various embodiments, the damaged region may be occluded by placing an object over the damaged area, over a portion of the scanning device or at any point between the scanning device and the damaged area that prevents the image of the damaged region 404 from being viewed by the scanning device. Therefore, the scanning device obtains an image of only the non-occluded region, which approximately corresponds to the non-damaged barcode area 412. Covering the damaged region 404 removes the pattern that otherwise confuses the scanning device. Therefore, the scanning device may read the barcode without interference by the damaged region. In various embodiments, an indicator 410 such as the hand contour 410 or instructions may be printed alongside the peacocked barcode instructing the operator to cover the damaged area prior to scanning. As viewed with respect to the search space of FIG. 4, occluding the damaged region of the barcode from view of the scanning device reduces the search space of the barcode from search space 500 to search space 508, thereby decreasing an amount of time for scanning the barcode below a scanning duration of the scanning device. Such reduction of search space thereby enables reading of the barcode.

Figure 6:
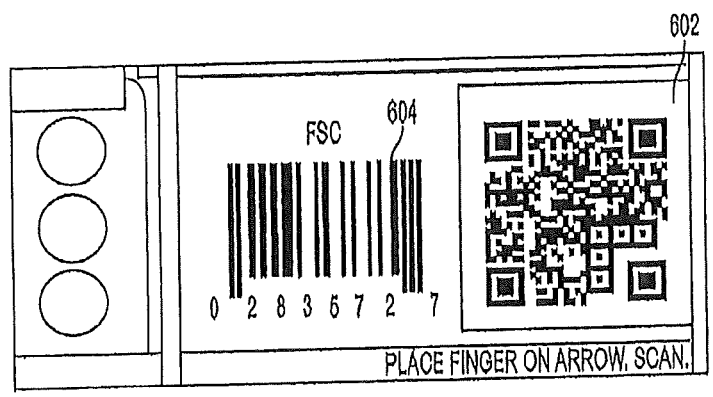
FIG. 6 shows an exemplary peacocked barcode proximate a Universal Produce Code barcode.

FIG. 6 shows an exemplary peacocked barcode 602 proximate a UPC barcode 604. In various embodiments, the UPC barcode 604 and peacocked barcode 602 may be printed side-by-side. Since the UPC barcode 604 is proximate the peacocked barcode 602, the scanning device may scan both the UPC barcode 604 and the peacocked barcode 602 during the same scanning operation. Thus, the scanning device may perform decoding operations on both of the barcodes during the same scanning operation. Since the peacocked barcode is "damaged" or disabled, the scanner generally deciphers the UPC barcode 502 before it deciphers the peacocked barcode 504. Since decoding the UPC barcode 502 completes the objective of the scanner, the scanner ends its scanning operation without reading the peacocked barcode. To read the peacocked barcode 504, the operator covers the damaged area and scans the peacocked barcode. Thus, the peacocked area is read only when the operator intends to read it. The peacocked barcode may be printed along any orientation for the convenience of the user. For example, the barcode may be printed to accommodate either left-handed users or right-handed users. The peacocked barcode may also be printed at any selected orientation angle.

Figure 7:
FIGS. 7-10 show various exemplary alternate embodiments of a peacocked barcode of the present disclosure.
Figure 8:
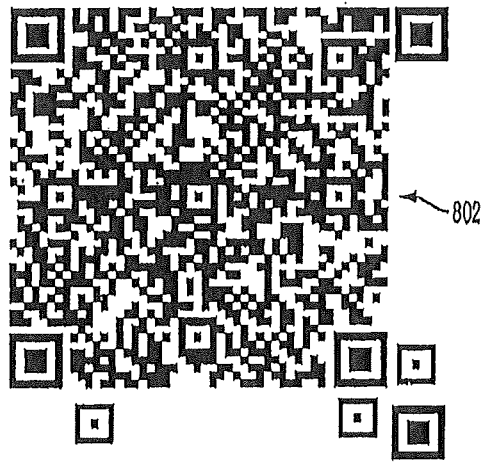
Figure 9:
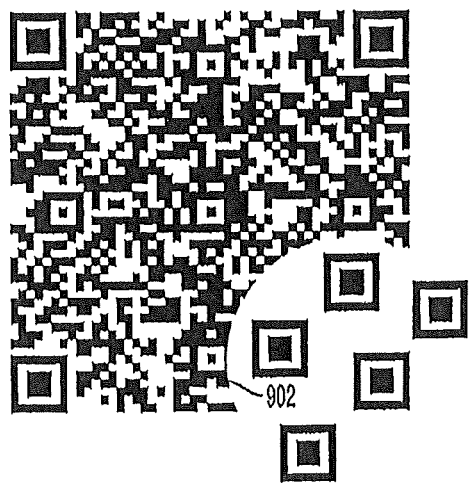
Figure 10:
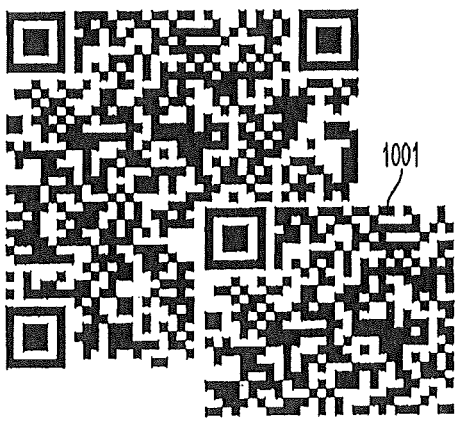

FIGS. 7-10 show various exemplary alternate embodiments of a peacocked barcode. FIG. 7 illustrates that the replacement section may be any selected size. In FIG. 7, the replacement section is about the size of a finder pattern. FIG. 8 shows a peacocked barcode that includes patterns located in the quiet area 802 of the barcode. Placing the patterns in the quiet area 802 may slow recognition of the barcode by the scanner, resulting in effectively disabling the barcode. FIG. 9 shows a peacocked barcode wherein the damaged region includes various contours besides those that adhere to the rectilinear grid system of the barcode. In particular, a contour 902 of the damaged region is circular. FIG. 10 shows a peacocked barcode wherein the damaged region includes another barcode section 1001. In one embodiment, at least two peacocked barcodes may be constructed so as to disable each other from being read. A part of the first peacocked barcode may serve as a damaged region of the second peacocked barcode and prevents the second peacocked barcode from being read. At the same time, a part of the second peacocked barcode may serve as a damaged region of the first peacocked barcode, thereby preventing reading of the first peacocked barcode. The operator may choose to cover the first peacocked barcode and scan the second peacocked barcode, or vice versa. In an exemplary embodiment, a sticker may be placed over a section of the barcode that includes a pattern such as a finder pattern and/or an alignment pattern to create the damaged region of the barcode and thereby create the peacocked barcode. Removing the sticker therefore enables the barcode to be read by a scanning device. Alternatively, a clear or "undamaged" sticker may be placed over a damaged region of a peacocked barcode to occlude the damaged region, thereby rending the barcode readable.

Figure 11:
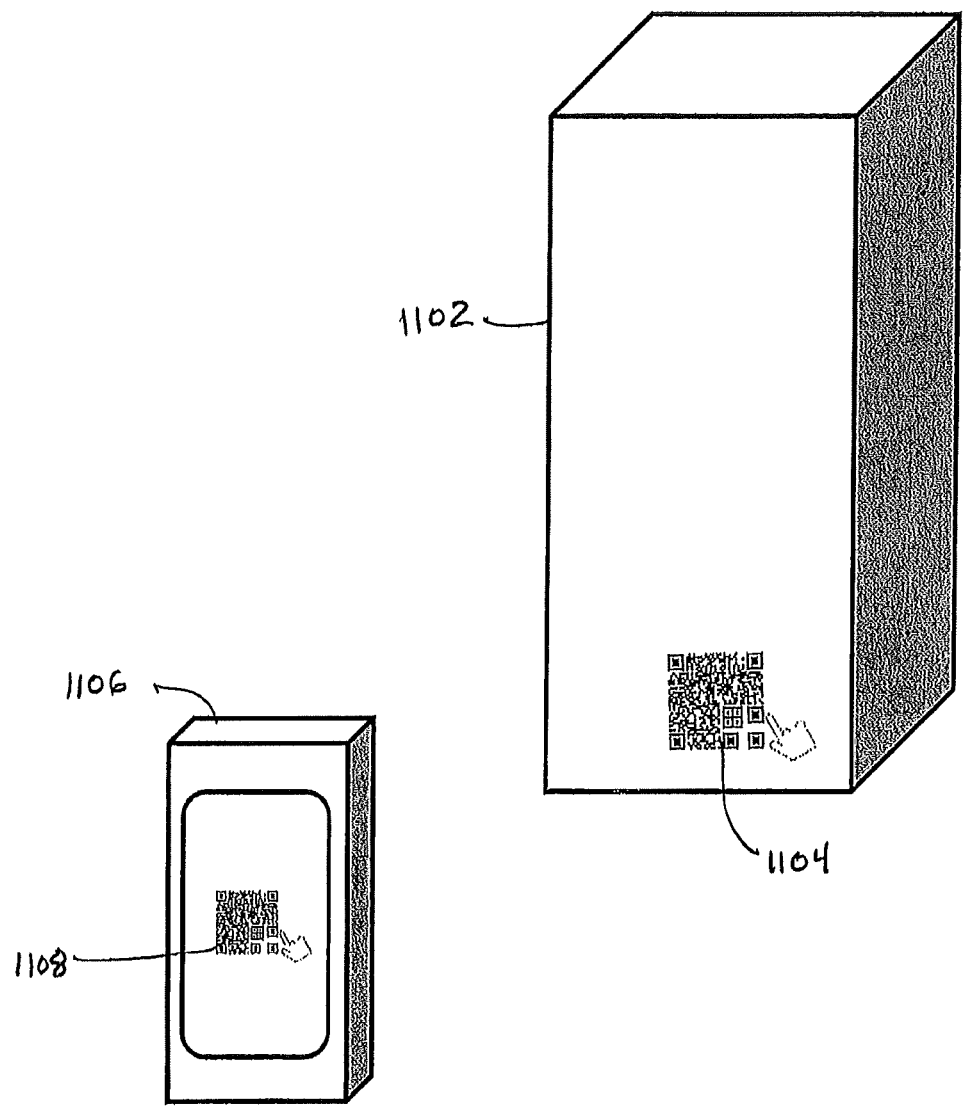
FIG. 11 shows an exemplary article that has an exemplary peacocked barcode of the present disclosure disposed thereon.

FIG. 11 shows an exemplary article 1102 that includes an exemplary peacocked barcode 1104 of the present disclosure disposed thereon. The article 1102 may be a package for a consumer product, such as cereal, milk, soda, etc. or an inventoried item, for example. The article 1102 may further be a poster such as a movie poster or concert poster. The article may be an advertisement, such as an advertisement page of a magazine. The article 1102 may also be a monitor such as a computer or television monitor that produces the barcode electronically. Scanner 1106 is shown alongside the article 1102 and an image 1108 of the peacocked barcode 1104 is captured at the scanner 1106. In various embodiments, the scanner 1106 is a smartphone such as an iPhone or equivalent or a device having similar imaging capabilities, such as an iPad or equivalent or a laser scanner.

In one aspect the barcode may be read by removing the damaged area of the barcode from view of the scanner. In one embodiment, this may be done by occluding the damaged region of the barcode, for instance, by placing an object over the pattern or placing an object over the scanning device to occlude the pattern. Alternatively, the damaged area may be removed by modifying a physical structure of the article that the barcode is printed on. Modifying the physical structure thus changes a view of the barcode. In various embodiments, modifying the physical structure of the article may be performed by folding the article or tearing the article.

Figure 12:
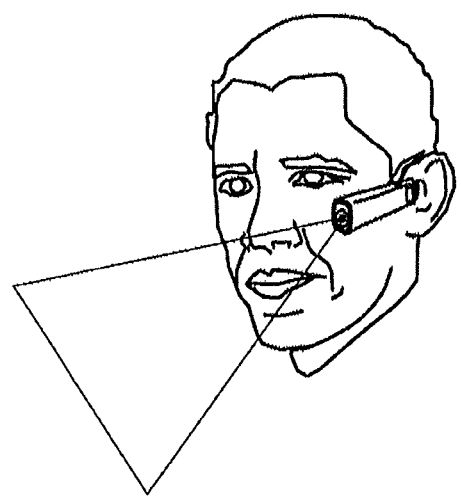
FIGS. 12 and 13 show various barcode scanners that may be suitable for use with the exemplary article having the peacocked barcode of the present disclosure.
Figure 13:
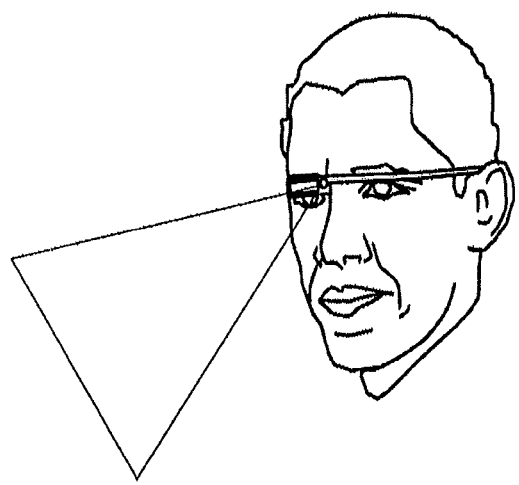

FIGS. 12 and 13 show various barcode scanners that may be suitable for use with the exemplary article having the peacocked barcode of the present disclosure. FIG. 12 shows a point-of-view camera that includes a barcode scanner and that may be worn as an earpiece of a user. The barcode scanner is thus located substantially at an ear of the user. FIG. 13 shows a point-of view camera that includes a barcode scanner, wherein the barcode scanner is located substantially at an eye location of the user. For such point-of-view cameras of FIGS. 12 and 13, several barcodes may be in a line-of-sight of the cameras. Additionally, it is not ergonomically plausible for the user to adjust his or her body in order to bring the point-of-view camera within scanning distance of a barcode on an article. Thus, the peacocked barcodes enables the user to select a barcode for scanning among many barcodes that may in the line-of-sight of the exemplary point-of-view cameras of FIGS. 12 and 13.

While the disclosure is described with respect to a two-dimensional barcode, the disclosure may be applicable to any signal that includes an encoded message and a selected message that prevents or hinders the encoded message from being read at a reader, wherein removal of the selected message enables the encoded message to be read. The disclosure may also be applicable to any signal that includes an encoded message and a selected message such as a second obscuring signal, wherein the selected message expands a search space of the encoded message. Therefore, in another embodiment, a method is disclosed of disposing two radio frequency identification (RFID) tags on a product, wherein the presence of the second RFID tag prevents an RFID reader from reading the message of the first RFID tag, wherein the first RFID tag includes a single having the encoded message and the second RFID tag includes the second obscuring signal. An operator may remove the second RFID tag in order to read the encoded message of the first RFID tag by performing a suitable action that prevents the second obscuring signal from being read by the RFID reader. Such suitable action may include, for example, destroying, deactivating, removing and covering the second radio frequency identification device.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method of disseminating an encoded message, comprising:
   printing a two-dimensional selectively readable barcode onto an article, said two-dimensional barcode employing a two-color encoding scheme;
   said two-dimensional barcode having:
      a data area that consists of a QR encoded message and a quiet zone surrounding said data area that enables an ordinary scanning device to locate said data area;
      said data area embodied within an area defined by four corners diametrically opposite one another, and having three finder patterns located at the top left, top right and bottom left corners of three corners of said four corners of said data area, said three finder patterns serving to determine an orientation of said two-dimensional selectively readable barcode to enable a reading of said two-dimensional selectively readable barcode;
   removing a section of said two-dimensional selectively readable barcode at said fourth corner of said data area; then
   encoding a Reed-Solomon standard error correction code new message at said fourth corner of said data area;
   replacing said removed section at said fourth corner of said data area of said two-dimensional selectively readable barcode with said new message to form a damaged region wherein said damaged, region consists of a distractor pattern comprising a fourth finder pattern and a cluster of confusing alignment patterns to form a peacocked code (pQR), said distractor pattern comprising said peacocked code (pQR) functioning to confuse said ordinary scanning device thereby interfering with said ordinary scanning device's ability to decode an encoded message on said two-dimensional selectively readable barcode on said article;
      wherein replacing said removed section with said new message to form a damaged region containing said peacocked code (pQR) expands a search space of the said two-dimensional selectively readable barcode while concurrently rendering said QR code unscannable; and wherein expanding said search space of said QR code increases a read time of said QR code by the scanning device and reducing said search space of the QR code decreases the read time of the QR code; then,
   occluding said distractor pattern containing said peacocked code (pQR) in said damaged region from the purview of said ordinary scanning device, by placing an object between said ordinary scanning device and said distractor pattern to prevent an image of said damaged region from being viewed by said ordinary scanning device, with the result that said ordinary scanning device obtains an image of only a non-damaged QR barcode area,
      wherein occluding said distractor pattern containing said peacocked code (pQR) damaged region of said non-damaged QR barcode area from said purview of said ordinary scanning device reduces said search space of said, two-dimensional selectively readable QR barcode, thereby decreasing an amount of time for scanning said QR barcode below a scanning duration of said scanning device.

2. The method of claim 1 wherein said increased read time is greater than at least one of: a decoding time of another barcode, and a scanning duration of the scanning device.

3. The method of claim 1, wherein said distractive pattern in said damaged region is configured to disable reading of said encoded message for a time that is at least one of: a time to decode another encoded message that is scanned substantially simultaneously with the encoded message in the QR, code, and a scanning duration of said scanning device.

4. The method of claim 1, wherein providing said finder pattern in said damaged region further comprises at least one of: adding the finder pattern in the selected region, adding a pattern encroaching into a quiet zone surrounding the data area of the barcode; printing a portion of another barcode in the selected region, placing a sticker over a portion of the barcode.

5. The method of claim 1, wherein occluding said distractive pattern in said damaged region from said purview of said scanning device further comprises one of: folding over said pattern, overlaying said pattern with a sticker, overwriting said pattern, removing said sticker, and placing an object over said scanning device.

6. The method of claim 1, wherein said scanning device includes one of: a laser scanner, a smartphone, and a point-of-view device.

7. The method of claim 1, wherein said scanning device reads the barcode and at least one other barcode during a same scanning operation, and said scanning device reads a message encoded in said other barcode.

8. A method of disseminating an encoded message, consisting of:
   printing a two-dimensional selectively readable barcode onto an, article, said two-dimensional barcode employing a two-color encoding scheme;
   said two-dimensional barcode having:
      a data area that consists of a QR encoded message and a quiet zone surrounding said data area that enables an ordinary scanning device to locate said data area;
      said data area embodied within an area defined by four corners diametrically opposite one another, and having three finder patterns located at the top left, top right and bottom left, corners of three corners of said four corners of said data area, said three finder patterns serving to determine an orientation of said two-dimensional selectively readable barcode to enable a reading of said two-dimensional selectively readable barcode;
   removing a section of said two-dimensional selectively readable barcode at said fourth corner of said data area; then
   encoding a Reed-Solomon standard error correction code new message at said fourth corner of said data area:
   replacing said removed section at said fourth corner of said data area of said two-dimensional selectively readable barcode with said new message to form a damaged region wherein said damaged region consists of a distractor pattern composing a fourth finder pattern and a cluster of confusing alignment patterns to form a peacocked code (pQR), said distractor pattern comprising said peacocked code (pQR) functioning to confuse said ordinary scanning device thereby interfering with said ordinary scanning device's ability to decode an encoded message on said two-dimensional selectively readable barcode on said article;
  wherein replacing said removed section with said new message to form a damaged region containing said peacocked code (pQR) expands a search space of the said two-dimensional selectively readable barcode while concurrently rendering said QR code unscannable; and
  wherein expanding said search space of said QR code increases a read time of said QR code by the scanning device and reducing said search space of the QR code decreases the read time of the QR code; then,
occluding said distracter pattern containing said peacocked code (pQR) in said damaged region from the purview of said ordinary scanning device, by placing an object between said ordinary scanning device and said distractor pattern to prevent an image of said damaged region from being viewed by said ordinary scanning device, with the result that said ordinary scanning device obtains an image of only a non-damaged QR barcode area,
  wherein occluding said distractor pattern containing said peacocked code (pQR) damaged region of said non-damaged QR barcode area from said purview of said ordinary scanning device reduces said search space of said two-dimensional selectively readable QR barcode, thereby decreasing an amount of time for scanning said QR barcode below a scanning duration of said scanning device.

* * * * *